United States Patent [19]
Nguyen

[11] Patent Number: 6,032,150
[45] Date of Patent: Feb. 29, 2000

[54] SECURE GRAPHICAL OBJECTS IN WEB DOCUMENTS WITH A PROGRAM APPLET PLACED TO PRESENT FURTHER INFORMATION UPON SELECTED CONDITIONS

[75] Inventor: Julien T. Nguyen, Saratoga, Calif.

[73] Assignee: PlanetWeb, Inc., Mountain View, Calif.

[21] Appl. No.: 08/918,094

[22] Filed: Aug. 25, 1997

[51] Int. Cl.[7] .................................................. G06F 17/30
[52] U.S. Cl. ............................................ 707/102; 707/513
[58] Field of Search ................ 707/102, 10; 395/187.01, 395/200.76, 561, 701; 709/223; 380/24

[56] References Cited

U.S. PATENT DOCUMENTS

| | | | |
|---|---|---|---|
| 5,377,354 | 12/1994 | Scannell et al. | 395/673 |
| 5,508,817 | 4/1996 | Kunigami | 358/402 |
| 5,513,126 | 4/1996 | Harkins et al. | 395/200.38 |
| 5,548,789 | 8/1996 | Nakanura | 395/200.36 |
| 5,619,648 | 4/1997 | Canale et al. | 395/200.36 |
| 5,623,603 | 4/1997 | Jiang et al. | 395/200.37 |
| 5,627,764 | 5/1997 | Schutzman et al. | 395/200.37 |
| 5,666,542 | 9/1997 | Mitsuyoshi et al. | 395/762 |
| 5,675,507 | 10/1997 | Bobo, II | 395/200.36 |
| 5,706,502 | 1/1998 | Foley et al. | 707/10 |
| 5,710,883 | 1/1998 | Hong et al. | 395/200.76 |
| 5,734,835 | 3/1998 | Selker | 709/249 |
| 5,737,599 | 4/1998 | Rowe et al. | 395/615 |
| 5,742,768 | 4/1998 | Gennaro et al. | 1/1 |
| 5,754,700 | 5/1998 | Kuzma | 382/236 |
| 5,754,765 | 5/1998 | Danneels et al. | 709/222 |
| 5,761,673 | 6/1998 | Bookman et al. | 707/104 |
| 5,764,235 | 6/1998 | Hunt et al. | 345/428 |
| 5,781,741 | 7/1998 | Imamura et al. | 395/200.66 |
| 5,781,785 | 7/1998 | Rowe et al | 395/774 |
| 5,784,553 | 7/1998 | Kolawa et al. | 395/183.14 |
| 5,787,470 | 7/1998 | DeSimone et al. | 711/124 |
| 5,794,039 | 8/1998 | Guck | 709/303 |
| 5,802,530 | 9/1998 | Van Hoff | 707/513 |
| 5,805,829 | 9/1998 | Cohen et al. | 395/200.32 |
| 5,842,020 | 11/1998 | Faustini | 395/701 |
| 5,850,446 | 12/1998 | Berger et al. | 380/24 |
| 5,870,544 | 2/1999 | Curtis | 395/187.01 |
| 5,872,915 | 2/1999 | Dykes et al. | 395/188.01 |
| 5,875,322 | 2/1999 | House et al. | 395/561 |
| 5,878,223 | 3/1999 | Becker et al. | 709/223 |
| 5,889,942 | 3/1999 | Orenshteyn | 713/201 |
| 5,956,701 | 9/1999 | Habermehl | 706/20 |

*Primary Examiner*—Paul R. Lintz
*Assistant Examiner*—Ella Colbert
*Attorney, Agent, or Firm*—Swernofsky Law Group

[57] ABSTRACT

The invention provides a method and system for presenting infromation in a web document using a program applet to restrict further copying or redistribution. The web document includes a first region in which a graphical element or other information is displayed, and a second region covering the first region in which a program applet is invoked by a server for the web document. The program applet is dynamically created upon access, and assigned a serial number. The program applet contacts the server for permission to display the graphical element or other information; thus, the server can control, by granting or denying permission, when and if the program applet displays the graphical or other information. The program applet can be subjected by the server to one or more of a variety of restrictions, such as: a limit on the number of times the information is displayed, a time limit, a requirement for a password or other security authentication, a requirement that the program applet is executing at a selected device or from a selected web document, or other requirements the server may deem fit to impose.

20 Claims, 1 Drawing Sheet

SECURE GRAPHICAL OBJECTS IN WEB DOCUMENTS WITH A PROGRAM APPLET PLACED TO PRESENT FURTHER INFORMATION UPON SELECTED CONDITIONS

BACKGROUND OF THE INVENTION

1. Field of the Invention

The invention relates to web documents.

2. Related Art

"Web documents" are hypertext documents, including information and capable of including hypertext pointers to other web documents. Other web documents can be located on the same computer or on another computer in a network of computers, the largest such network of which is commonly known as the "internet" (but such networks may be independent networks or may be part of a private network commonly known as an "intranet"). The information in web documents can include text, graphical elements, program applets, and other information formats.

One problem which has arisen in the art is that servers of web documents desire to be able to present information to web clients, without those web clients being able to copy that information and retain it permanently. This problem is particularly acute for graphical information, which must be transmitted to the web client display, but once transmitted can be retained and even edited by the web client using graphical editing tools.

Known web documents sometimes include reduced-size ("thumbnail") graphical elements, which substitute for full size graphical elements and allow the user of the web client to have an idea of the nature of the full size graphical element. Payment can be required before the user of the web client is given access to the full size graphical element.

While this method has some value in preventing wholesale copying of graphical elements and other information from web documents, it suffers from several drawbacks. First, the web client can copy the information from the thumbnail graphical element, and the user of that web client can use graphical editing tools to enhance the quality of the thumbnail graphical element. Second, once the user has paid for the full size graphical element, there is nothing (other than possible legal restrictions) preventing the user from copying and redistributing that full size graphical element.

Accordingly, it would be desirable to provide a method and system for presenting graphical elements and other information in web documents, without allowing web clients unrestricted ability to copy and redistribute that information. This advantage is achieved in an embodiment of the invention in which each graphical element in a web document is protected by a program applet, which can display the graphical element or other information for a limited time.

SUMMARY OF INVENTION

The invention provides a method and system for presenting infromation in a web document using a program applet to restrict further copying or redistribution. The web document includes a first region in which a graphical element or other information is displayed, and a second region covering the first region in which a program applet is invoked by a server for the web document. The program applet is dynamically created upon access, and assigned a serial number. The program applet contacts the server for permission to display the graphical element or other information; thus, the server can control, by granting or denying permission, when and if the program applet displays the graphical or other information.

In a preferred embodiment, the program applet can be subjected by the server to one or more of a variety of restrictions, such as: a limit on the number of times the information is displayed, a time limit, a requirement for a password or other security authentication, a requirement that the program applet is executing at a selected device or from a selected web document, or other requirements the server may deem fit to impose.

DETAILED DESCRIPTION OF THE PREFERRED EMBODIMENT

Figure 1:
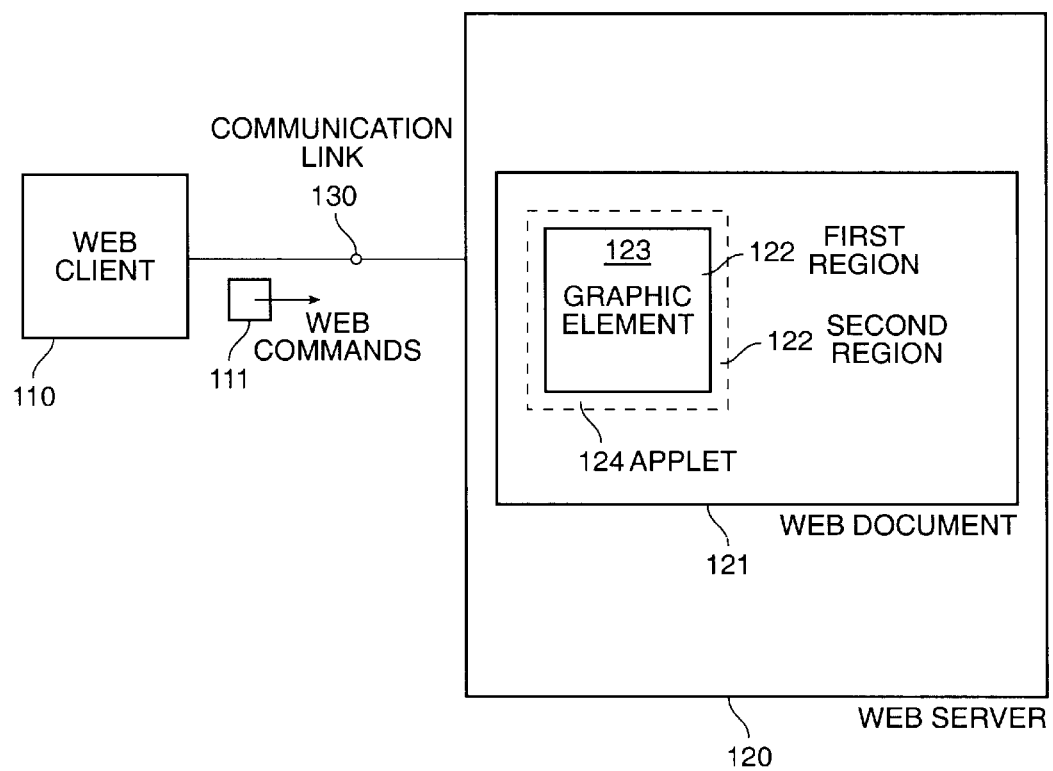
FIG. 1 shows a block diagram of a system including a web client and a web server, the web server having a web document including graphical information protected by a program applet.

In the following description, a preferred embodiment of the invention is described with regard to preferred process steps and data structures. Those skilled in the art would recognize after perusal of this application that embodiments of the invention can be implemented using general purpose processors or special purpose processors adapted to particular process steps and data structures described herein, and that implementation of the process steps and data structures described herein would not require undue experimentation or further invention.

Inventions described herein can be used in conjunction with inventions described in the following applications:

Application Ser. No. 08/918,096, Filed Aug. 21, 1997, in the name of the same inventor, titled "Micro-Client For Internet Appliance", attorney docket number NOVA-004; and Application Ser. No. 08/918,698, Filed Aug. 21, 1997, in the name of the same inventor, titled "Active Electronic Mail", attorney docket number NOVA-005.

Each of these applications is hereby incorporated by reference as if fully set forth herein.

System Including Web Client and Server

FIG. 1 shows a block diagram of a system including a web client and a web server, the web server having a web document including graphical information protected by a program applet.

The system 100 includes a web client 110 and a web server 120 coupled by a communication link 130. The web client 110 can be responsive to an operator or user. The web client 110 issues web commands 111 and transmits those web commands 111 to the web server 120 using the communication link 130. The web server 120 response to those web commands 111 and serves a web document 121 to the web client 110 using the communication link 130.

In a preferred embodiment, the communication link 130 includes a network of computers, such as the network of networks known as the "internet", but can in addition or instead include a private network sometimes known as an "intranet" or an "extranet". In alternative embodiments, the communication link 130 may include other techniques for communication between the web client 110 and the web server 120, such as for example a frame relay network, or local area network, or a switched telephone network.

The web document 121 includes information which the web server 120 transmits to the web client 110 for presentation to the user. For example, this information can include text, graphical elements, program applets, and information in other formats.

The web document 121 can also include a set of regions 122 which the user may select and which the web client 110 may thus direct the web server 120 to take further action in response thereto. For example, the web client 110 can direct the web server 120 to transmit further information to the web client 110 for presentation to the user, the web client 110 can direct the web server 120 to follow a hyperlink and thus transmit a related web document 121 to the web client 110, or the web client 110 can direct the web server 120 to invoke a program at the web server 120 for generating further information for transmission to the web client 110 and presentation to the user.

Information Protected By Program Applet

A first region 122 of the web document 121 includes a graphical element 123 which is presented to the user as part of the web document 121. A second region 122 of the web document 121 includes a program applet 124 which is transmitted to and invoked at the web client 110 in response to the user selecting that second region 122. The second region 122 is positioned to completely cover the first region 122, so if the user attempts to select the first region 122 (and thus to select the graphical element 123), the second region 122 (and thus the program applet 124) is instead selected. Thus, it is not possible for the user to select the graphical element 123 directly, as all locations in the first region 122 instead operate to select the program applet 124.

The program applet 124 is dynamically created at or about the time of selection by the server 120, and is given a unique ID by the server 120. In a preferred embodiment, the unique ID includes a serial number and a checksum, encrypted by the server 120 so that the unique ID cannot be easily spoofed by the user.

The program applet 124 is disposed to execute at the web client 110 and to present the graphical element 123 in further detail (or other further information) to the user at the web client 110. Each time the program applet 124 executes to present the further information, it contacts the server 120 for permission to do so. The server 120 associates the specific program applet 124 having the unique ID with a set of conditions under which the program applet 124 can continue to display the further information to the user.

In a preferred embodiment, the set of conditions includes one or more of the following:

The program applet can be limited to a selected number of times it is permitted to present the further information (for example, no more than one time).

The program applet can be limited to a selected period of time it is permitted to present the further information (for example, for no more than one hour from creation, or only during selected times of day or days of the week).

The program applet can be limited to presenting the further information only if the user presents a selected authenticator (such as a password associated with the specific program applet).

The program applet can be limited to presenting the further information from a selected device, network domain, or web document (such as only from the original web document, or only from the specific device hosting the server).

The program applet can be limited to presenting the further information only upon satisfaction of a financial condition (such as upon a selected payment from the user, or upon confirmation by the server of a license for the user).

The program applet can be limited to selected types of presentation of the further information (such as being able to present, but refusing to print or save, the further information).

In a preferred embodiment, the server 120 can modify the conditions associated with the specific program applet 124, per unique ID, or can dynamically create a new specific program applet 124 with a new unique ID, upon satisfaction of selected conditions by the user. For example, the server 120 can require that the user pay for further use, or obtain administrative permission for further use, or impose other conditions on further use, of the program applet 124.

Alternative Embodiments

Although preferred embodiments are disclosed herein, many variations are possible which remain within the concept, scope, and spirit of the invention, and these variations would become clear to those skilled in the art after perusal of this application.

I claim:

1. A method, including the steps of
   presenting a web document from a web server to a web client, said web document including a first region associated with a set of further information;
   generating a program applet in response to selection of said first region, said program applet being disposed to present said further information only upon selected conditions; and
   transmitting said program applet to said web client.

2. A method as in claim 1, wherein said further information includes more detailed graphical information.

3. A method as in claim 1, wherein said further information includes access to a database.

4. A method as in claim 1, wherein said selected conditions include a selected number of times for presenting said further information, a selected period of time for presenting said further information, a requirement for presentation of selected authentication by said user, a requirement that the program applet is executing at a selected device or from a selected web document.

5. A method as in claim 1, wherein said selected conditions include a selected type of presentation of said further information.

6. A method as in claim 1, wherein
   said program applet includes a unique ID;
   said program applet attempts confirmation of said selected conditions with said web server at selected times; and
   said program applet refuses to present said further information without said confirmation being successful.

7. A method as in claim 6, wherein
   said selected times include times when said program applet is requested to present said further information.

8. A system, including:
   a browser mechanism configured to present a web document from a web server to a web client, said web document including a first region associated with a set of further information;
   an applet generation mechanism, at said web server, configured to generate a program applet in response to selection of said first region at the browser mechanism, said program applet being disposed to present said further information only upon selected conditions; and
   a networking mechanism configured to transmit said program applet from said web server to said web client for execution by the browser mechanism.

9. A system as in claim 8, wherein said further information includes more detailed graphical information.

10. A system as in claim 8, wherein said further information includes access to a database.

11. A system as in claim 8, wherein said selected conditions include a selected number of times for presenting said further information, a selected period of time for presenting said further information, a requirement for presentation of selected authentication by said user, a requirement that the program applet is executing at a selected device or from a selected web document.

12. A system as in claim 8, wherein said selected conditions include a selected type of presentation of said further information.

13. A system as in claim 8, wherein said program applet includes a unique ID;

said program applet attempts confirmation of said selected conditions with said web server at selected times; and said program applet refuses to present said further information without said confirmation being successful.

14. A system as in claim 13, wherein said selected times include times when said program applet is requested to present said further information.

15. A computer program product including:

a computer usable storage medium having computer readable code embodied therein for causing a computer generate a program applet, said computer readable code including:

computer readable program code configured to cause said computer to effect a browser mechanism configured to present a web document from a web server to a web client, said web document including a first region associated with a set of further information;

computer readable program code configured to cause said computer to effect an applet generation mechanism, at said web server, configured to generate said program applet in response to selection of said first region at the browser mechanism, said program applet being disposed to present said further information only upon selected conditions; and computer readable program code configured to cause said computer to effect a networking mechanism configured to transmit said program applet from said web server to said web client for execution by the browser mechanism.

16. A computer program product as in claim 15, wherein said further information includes more detailed graphical information.

17. A computer program product as in claim 15, wherein said selected conditions include a selected number of times for presenting said further information, a selected period of time for presenting said further information, a requirement for presentation of selected authentication by said user, a requirement that the program applet is executing at a selected device or from a selected web document.

18. A computer program product as in claim 15, wherein said selected conditions include a selected type of presentation of said further information.

19. A computer program product as in claim 15, wherein said program applet includes a unique ID;

said program applet attempts confirmation of said selected conditions with said web server at selected times; and said program applet refuses to present said further information without said confirmation being successful.

20. A computer program product as in claim 19, wherein said selected times include times when said program applet is requested to present said further information.

\* \* \* \* \*

UNITED STATES PATENT AND TRADEMARK OFFICE
CERTIFICATE OF CORRECTION

PATENT NO. : 6,032,150  
APPLICATION NO. : 08/918094  
DATED : February 29, 2000  
INVENTOR(S) : Julien T. Nguyen Page 1 of 1

It is certified that error appears in the above-identified patent and that said Letters Patent is hereby corrected as shown below:

Title page, add the following:

--OTHER PUBLICATIONS--

--Chung-Ming Huang et al: "Multimedia E-Mail: The Evolution Approach Based On Adapters" Software Practice & Experience, vol. 24, No. 9, Sep. 1,1994, pp. 785-800. XP000655471 ISSN: 0038-0644 pages 794, line 3 - page 797, line 2; figures 11, 12.--
--Ouhyoung M et al: "The MOS Multimedia E-Mail System" Proceedings of the International Conference on Multimedia Computing and Systems, May 19, 1994, pp. 315-324, XP002073636 page 315, right-hand column, line 21 - page 319, left-hand column, line 3; figures 1,2; table 1.--
--Anonymous: "Graphical Command Line" IBM Technical Disclosure Bulletin, vol. 32, No. 8B, pages 313-314, XP002109975 New York, US. the whole document.--
--Anonymous: "Editing Word Processor Documents" IBM Technical Disclosure Bulletin, vol. 40, No. 7, pages 187-188, XP002109976 New York, US.--
--Brown, Mark; Using Netscape 2, pp. 327-375.--

Signed and Sealed this
Nineteenth Day of April, 2011

David J. Kappos
*Director of the United States Patent and Trademark Office*